Feb. 27, 1962 R. E. McKINLEY 3,022,766
MILKING MACHINE AND TEMPERATURE CONTROL
IN COMBINATION THEREWITH
Filed April 23, 1959

INVENTOR.
RAYMOND E. McKINLEY
BY
*Charles L. Loverdale*
ATTORNEY

United States Patent Office 3,022,766
Patented Feb. 27, 1962

3,022,766
MILKING MACHINE AND TEMPERATURE CONTROL IN COMBINATION THEREWITH
Raymond E. McKinley, 3808 Cherry St., Erie, Pa.
Filed Apr. 23, 1959, Ser. No. 808,446
4 Claims. (Cl. 119—14.14)

This invention relates to milking machines and, more particularly, to machines for milking animals and simultaneously indicating the body temperature of the animal being milked.

The basic feature of this invention is the combination of a temperature indicating device and a milking machine to create a simple means of detecting certain illnesses in milking animals by the determination of the temperature of the milk as it is withdrawn from the udder of the animal. The animal could be any of the genus of mammals but, in the general situation, will be a bovine cow.

One of the major problems in the dairy industry is the early detection of disease so that treatment can be initiated before the condition becomes untenable or before milk from the diseased animal has passed to the consumer. Because of the commercialization of the milking industry with the recent increase in the utilization of hired help who may not be sufficiently observant to detect the early symptoms of disease, the problem of early detection of disease is increasing. Thus, some means of creating a simple expeditious procedure which can become a part of the total milking procedure to assist in the early detection of disease is needed.

The present invention makes it possible to readily determine the presence of diseases which have, as part of their symptomatology, an increase in the body temperature of the animal. This can be detected by the present invention. This makes it possible to readily detect that large class of conditions which fall in the infectious disease category and leaves only the metabolic diseases to be detected by ordinary means.

The present invention contemplates the use of a direct reading thermometer or the use of a thermocouple connected to a remotely situated indicating and/or recording instrument. The temperature sensitive portion of the device is either directly in the path of flow of milk or in proximity thereto and, having a highly conductive diaphragm therebetwen, it will indicate substantially the milk temperature. Since the temperature sensing element is so close to the body of the animal, the temperature of the milk at this point will be substantially that of the animal and, therefore, the animal's body temperature will be indicated.

It is, accordingly, an object of this invention to provide a combination milking machine and temperature indicating device which is simple in construction, economical to manufacture, and simple and efficient to use.

Another object of the invention is to provide an improved combination of temperature indicating instrument and milking machine.

Still another object of the invention is to provide a new combination of milking machine and temperature indicating device.

A further object of the invention is to provide an improved new combination of milking machine and temperature recording device.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
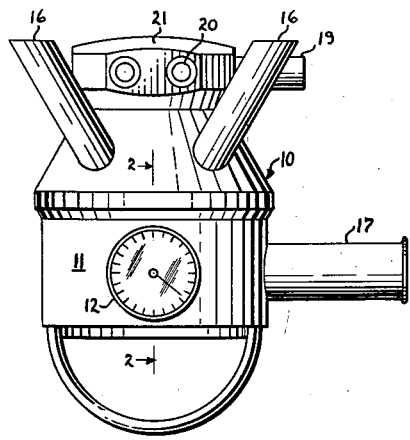
FIG. 1 is a side view of a milking unit with an indicating thermometer mounted thereon.
Figure 2:
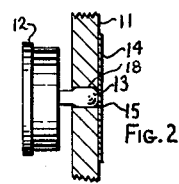
FIG. 2 is a partial cross sectional view taken on line 2—2 of FIG. 1.

Now with more specific reference to the drawing, FIGS. 1 and 2 show a manifold unit 10 having milk passage tubes 16, manifold walls 11, and an indicating thermometer 12 mounted in the manifold walls 11. A sensing device including a sensing bulb 13 and a plate is so located that milk from an animal being milked engages a plate 14 which is in contact with the bulb 13. A milk discharge tube 17 extends from the manifold wall 11 to be connected to a hose communicating with a milk can. Individual teat cups from which vacuum is applied from a connector 20 are connected to the passage tubes 16 and a vacuum line to a tube 19. The connectors 20 communicate from a manifold 21 to the tube 19.

In operation, the milk is drawn from the animal down into the milk passage tubes 16 and into the manifold unit 10 where the plate 14 is attached to the inside of the manifold wall 11 of the manifold unit 10. A hole 18 through the manifold wall 11 receives the thermometer bulb 13 which acts as a sensing element and which rests against the plate 14. The plate 14 may be made of silver or other good thermal conductive material. The dial type thermometer 12 or other suitable temperature indicating instrument will be attached to the thermometer bulb 13.

Holding the thermometer bulb 13 in place and packed around the lateral sides thereof is an insulation material 15 which will not conduct heat from the walls 11 to the bulb 13. This will not cause the thermometer reading to be affected by the temperature of the manifold wall 11 but, rather, the milk engaging the plate 14 will bring the plate 14 to the temperature of the milk which will be transferred to the thermometer bulb 13 and the thermometer 12 will register the milk temperature. The operator can thus observe the milk temperature and thereby check the temperature of the milk given by the animal as it flows through the manifold unit 10 and out the discharge tubes 17 to the waiting containers. The milk temperature will be the same as the animal's udder temperature. Thus, an ill animal can be noted readily and her milk may be rejected.

Figure 3:
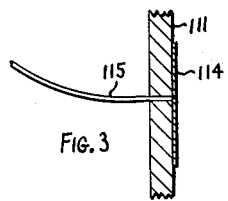
FIG. 3 is a cross sectional view similar to FIG. 2 of another embodiment of the invention.

Another embodiment of this invention is disclosed herein and illustrated in FIG. 3. Manifold walls 111 of a manifold unit such as the manifold unit 10 in FIG. 1 are shown. Themocouple wire 115 passes through the manifold wall 111 and is in contact with a silver plate 114. Thus, the milk passing over the silver plate 114 changes the temperature of the thermocouple to that of the milk. The resulting voltage generated by the thermocouple will be registeded on a suitable galvanometer situated at some location remote from the thermocouple. The galvanometer will be calibrated in degrees temperature.

Figure 4:
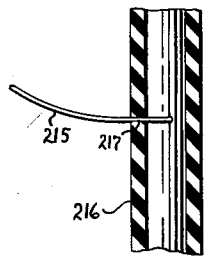
FIG. 4 is a cross sectional view of a teat cup milk line of still another embodiment of the invention.

In the embodiment of the invention shown in FIG. 4, each teat cup will be provided with a thermometer or thermocouple arrangement. One teat cup having walls 216 is shown in partial cross section. By this arrangement, the milk temperature from each quarter of the animal's udder may be observed. The temperature of one quarter actuates a thermocouple directly in the milk stream and may be recorded on four separate recording instruments or a single instrument may be used with suitable switching.

A thermocoupling wire 215 is passed through the rubber walls of a conventional teat cup or it could be passed through the rubber walls of the milk passage tubes 216 as seen in FIG. 4. The wire 215 extends into the hollow section of the wall 216 and the milk directly from the animal flows thereover. The thermocouple responds to any change of temperature of the milk as it flows through the teat cup. A hole 217 is of a smaller diameter than the wire 215, thereby forming a seal around the wire 215. The wire 215 can be withdrawn for cleaning purposes, therefore providing a sanitary device.

Figure 5:
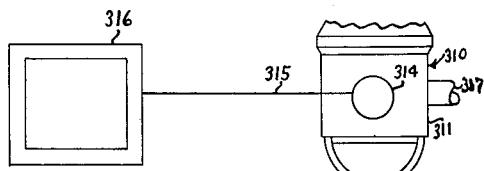
FIG. 5 is a diagrammatic view of a remote recording instrument in combination with a milking machine.

FIG. 5 shows a manifold unit 310 similar to the manifold unit 10 shown in FIG. 1. The manifold unit 310 has a pipe 317 and a hole in its manifold wall 311 similar to the hole 18 shown in FIG. 2 and covered by a plate 314. The hole receives a conventional thermocouple which is connected by wires 315 to a recording instrument 316 which may be any of the well known temperature recording instruments.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In a milking machine having a milk conducting manifold including milk delivery and discharge tubes as a part thereof, a temperature indicating device having a sensing portion within said manifold in thermoconducting relation with milk in said manifold whereby the temperature of said milk will be indicated by said temperature indicating device.

2. The milking machine recited in claim 1 wherein said temperature indicating device comprises a recording instrument disposed remotely from said milking machine.

3. The milking machine recited in claim 1 wherein said temperature indicating device comprises a temperature recording instrument disposed remotely from said milking machine and said sensing portion comprises a thermocouple.

4. The machine recited in claim 1 wherein said temperature indicating device comprises an indicating thermometer.

References Cited in the file of this patent

UNITED STATES PATENTS

| | | |
|---|---|---|
| 2,625,643 | Cordis | Jan. 13, 1953 |
| 2,755,999 | Vickers | July 24, 1956 |
| 2,892,347 | Laprand | June 30, 1959 |
| 2,898,549 | Miller | Aug. 4, 1959 |